United States Patent
Johnson et al.

[19]

[11] Patent Number: 6,155,469
[45] Date of Patent: Dec. 5, 2000

[54] NOTEPAD AND PEN HOLDER

[75] Inventors: Jason G. Johnson, Costa Mesa; John W. Goodin, Coto de Caca, both of Calif.

[73] Assignee: Jason G. Johnson, Costa Mesa, Calif.

[21] Appl. No.: 09/365,357

[22] Filed: Jul. 30, 1999

[51] Int. Cl.$^7$ ..................................................... B60R 11/00
[52] U.S. Cl. ........................... 224/482; 206/414; 221/31; 224/227; 224/559; 281/44; 281/51; 281/45; 462/72; D19/78; 108/44
[58] Field of Search ................................. 281/44, 45, 49, 281/51; 206/414; 224/277, 278, 483, 482, 559; 462/71, 72; 221/31; D19/78; 248/309.3; 108/44

[56] References Cited

U.S. PATENT DOCUMENTS

| | | | |
|---|---|---|---|
| D. 313,046 | 12/1990 | Colani | D19/78 |
| D. 317,017 | 5/1991 | Kheng | D19/78 |
| D. 338,497 | 8/1993 | Stahel et al. | D19/88 |
| 4,619,386 | 10/1986 | Richardson | 224/277 |
| 4,962,874 | 10/1990 | Hagglund | 224/277 |
| 5,025,919 | 6/1991 | Brinker et al. | 206/214 |
| 5,294,032 | 3/1994 | Hagglund | 224/277 |
| 5,485,944 | 1/1996 | Kauffman | 224/277 |

Primary Examiner—Gregory M. Vidovich
Assistant Examiner—Monica Carter
Attorney, Agent, or Firm—Akin, Gump, Strauss, Hauer & Feld, L.L.P.

[57] ABSTRACT

A notepad and writing instrument holder, particularly adapted for mounting on a surface within the interior of an automobile, for example, includes one piece construction comprising a molded plastic structure with first and second members which are hinged together along a living hinge portion. One of the members nests within the other such that opposed side panels of each member cooperate to retain the two members in a fixed position relative to each other to provide a writing surface for a notepad which is adjustable to suit the writer's needs and position relative to the notepad holder. Ratchet teeth formed on one member cooperate with detent members formed on the other member. The notepad holder may be injection molded in a generally flat planar configuration and the two members are formed by folding circular sector shaped side panels of each member with respect to center panels of each member into their working positions. The notepad holder may also have a scalloped or relieved surface to facilitate access to a recess holding a writing instrument and to facilitate access to a recess holding a notepad. A demountable suction cup is mounted on one of the members for supporting the notepad holder on a support surface.

12 Claims, 5 Drawing Sheets

NOTEPAD AND PEN HOLDER

FIELD OF THE INVENTION

This invention relates to notepad holders, and more particularly to notepad holders for use in automobiles and other vehicles so that notes may be taken during cellular telephone calls and the like.

BACKGROUND

As telecommunications technology has increased in recent years, telephone usage and cellular telephone usage, in particular, has increased substantially. Cellular telephones are portable wireless telephones that are able to communicate with a public switched telephone network (PSTN). As such, cellular telephones travel within individual cells that serve to appropriately route the telephone call as the cellular telephone wanders in a geographic area serviced by cellular technology. A variation of the cellular telephone is the car telephone that is generally permanently associated with its respective automobile. Due to the convenience and small size of current cellular telephones, they are often used in automobiles as well as being carried on one's person or in a purse or the like.

When communicating by telephone, the person engaged in the phone call may often receive information from the caller that is best retained when written down. Telephone numbers, addresses, and miscellaneous pieces of important information can easily slip one's mind. By writing such information down, it is retained much more easily and can be easily associated or affixed in a notebook, calendar or other temporary information slip holder.

The confines of contemporary automobiles generally afford few easy surfaces upon which to write. The vehicle dashboard surface is generally tilted or curved at a difficult writing angle for a person engaging in a telephone call while driving or sitting as a passenger in a car. Most of the other horizontal surfaces in an automobile are otherwise occupied or unavailable as a writing surface. Consequently, it becomes difficult for a person in an automobile engaging in a telephone call to quickly and easily locate a suitably flat and suitably disposed writing surface upon which to take notes regarding the phone call.

Solutions to this problem are present in the prior art; however, they generally maintain drawbacks instilled during their original design and have not changed much over the past twenty years, for example. In some, if not all, of these prior art notepads, only three adjustable positions are present. Additionally, prior art notepads are not as functional or convenient for use by drivers who are left-handed or for drivers of vehicles having the steering wheel on the right-hand side of the vehicle.

Consequently improvements in the present state of the art with respect to automobile notepads may be advantageously achieved to provide automobile drivers and passengers safer and better notepad writing structures thereby affording overall safer driving in today's age of rapidly increasing telecommunications activity.

SUMMARY OF THE INVENTION

The present invention provides new and useful means by which notes may be taken within the restricted confines of an automobile or the like when a person is conducting a conversation over a cellular telephone, or otherwise. A preferred embodiment of the invention provides a one-piece plastic injection-molded notepad that folds upon itself to provide an angularly adjustable writing surface. The notepad is preferably connected by a suction cup to a windshield or other suitable surface of an automobile interior. In one embodiment, resiliently biased detent means on one portion of the notepad engages and travels along a ratchet or ridged surface on another portion of the notepad in order to provide adjustment of the position of the writing surface.

A pencil or other writing implement holder recess may be supported on a facing portion of the notepad. The suction cup may attach to the rear of the notepad as by a rectangular boss or other means.

In one embodiment, the one-piece molded plastic construction of the improved notepad and pen holder of the present invention takes the form of an initial unfolded, planar member having a shape forming opposed wing-like panels connected to each other at a central living hinge portion. Two central, and generally square, panels are interconnected by a living hinge and form the main parts of the improved notepad. Side panels on opposite sides of each of the central panels are likewise connected by living hinges or fold lines to their associated central panels. These side panels are preferably somewhat circular sector shaped and flare angularly outward from the area adjacent the living hinge. Living hinges or fold lines also attach the side panels to their associated central panel. The front central panel is slightly wider than the rear central panel to allow the rear side panels to nest within the front side panels when the panels are folded into their working positions. The rear side panels preferably include outwardly-biased detents that engage corresponding ratchet-like teeth which are formed on opposed flange portions of the front side panels.

Those skilled in the art will further appreciate the above-mentioned advantages and superior features of the invention upon reading the detailed description which follows in conjunction with the drawings.

DETAILED DESCRIPTION OF PREFERRED EMBODIMENTS

In the description which follows like parts are marked throughout the specification and drawings with the same reference numerals, respectively. The drawing figures are not necessarily to scale and certain features of the invention may be shown exaggerated in scale or in somewhat general form in the interest of clarity and conciseness.

Figure 1:
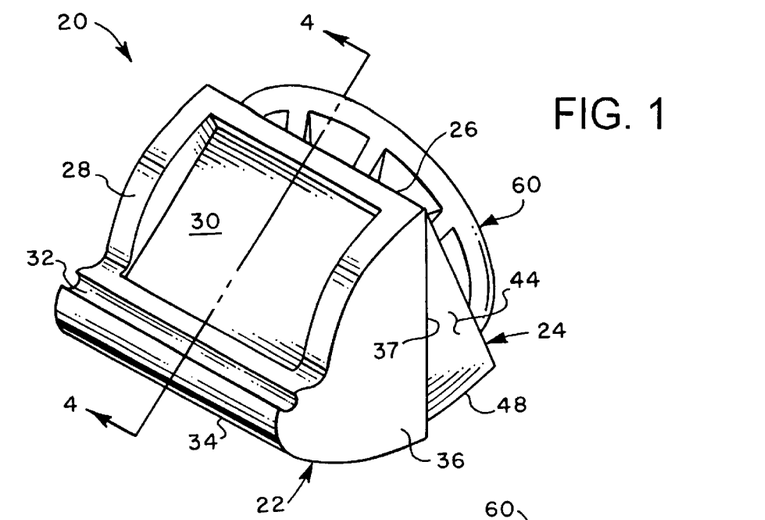
FIG. 1 is a perspective view of one preferred embodiment of a notepad and pen holder in accordance with the present invention.
Figure 4:
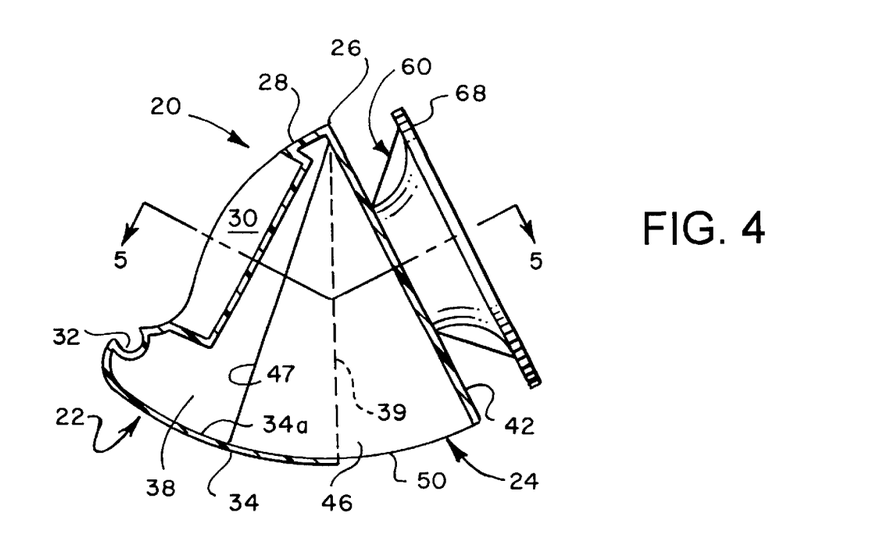
FIG. 4 is a section view taken generally along the line 4—4 of FIG. 1.
Figures 5, 6:
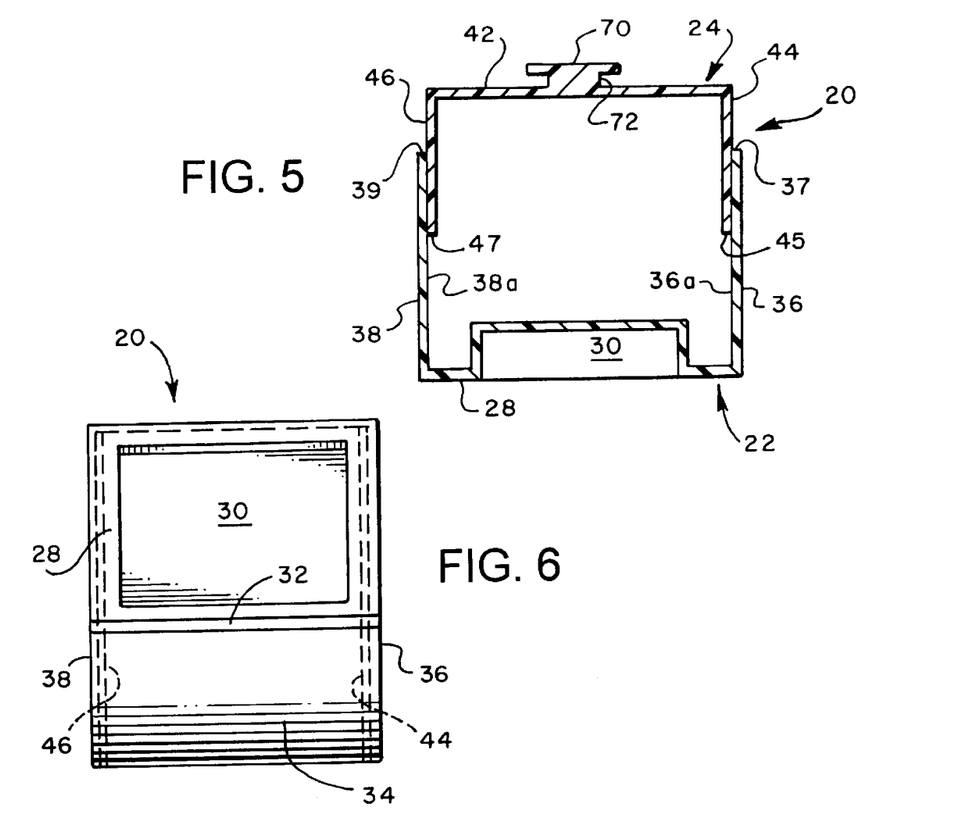
FIG. 5 is a section view taken along the line 5—5 of FIG. 4.
FIG. 6 is a front elevation of the embodiment shown in FIGS. 1, 4 and 5.
Figure 7:
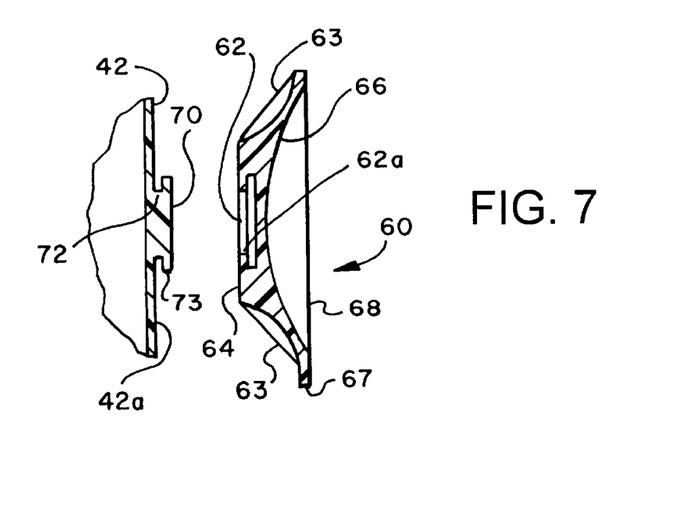
FIG. 7 is a detail exploded section view of the suction cup and retainer part of the notepad holder of the present invention.

Referring to FIG. 1, there is illustrated a notepad and writing instrument or pen holder in accordance with the invention and generally designated by the numeral 20. The notepad holder 20 is advantageously formed of a molded plastic material and is characterized by opposed somewhat clamshell-shaped members 22 and 24 which are integrally joined at a living hinge 26, see FIG. 4 also. The opposed clamshell-shaped members 22 and 24 may be integrally molded together and joined at the living hinge 26 and the member 22 is characterized by a somewhat arcuate convex front panel 28 which includes a generally rectangular box shaped wall portion defining recess 30 formed therein for receiving a conventional notepad and the like for supporting such notepad in the recess. The front panel 28 includes a lower transverse extending somewhat arcuate cavity or recess 32 formed therein for snugly receiving a writing instrument, such as a pencil or pen and wherein the writing instrument may be snapped into or out of the recess or moved longitudinally into or out of the recess. Front panel 28 is integrally joined to a bottom panel 34 which is integrally joined to opposed side panels 36 and 38, see FIGS. 4 and 5 also. As shown in FIGS. 1, 4 and 5, the side panels 36 and 38 are delimited by longitudinal edges 37 and 39 which extend from the living hinge 26 to the bottom panel 34 to form the somewhat clamshell-shaped member 22.

As shown in FIGS. 1, 4 and 5, the somewhat clamshell-shaped member 24 is operable to nest within the member 22 and is characterized by a rear panel 42 and opposed side panels 44 and 46 which are, respectively, delimited by longitudinal side edges 45 and 47, FIGS. 4 and 5. Side edges 45 and 47 extend from the living hinge 26 to somewhat arcuate convex bottom edges 48 and 50, FIGS. 1 and 5. The member 24 is dimensioned such that the outwardly facing surfaces of the side panels 44 and 46 are spaced apart a distance just slightly less than the distance between the inside surfaces of the side panels 36 and 38 of the member 22 so that the member 24 will nest within the member 22 when the members are moved with respect to each about the living hinge 26. In this regard also, the arcuate bottom edges 48 and 50 are dimensioned such that they fit snugly against the inside surface 34a of bottom panel 34, see FIG. 4. In fact, the spacing of the side panels 44 and 46 with respect to the inside surfaces 36a and 38a, FIG. 5, of the side panels 36 and 38 is such that the side panels of the respective members 22 and 24 may engage each other frictionally when they are moved relative to each other about the hinge 26. In this way, a selected position of the members 22 and 24 with respect to each other may be substantially retained and may require at least moderate effort to move one member relative to the other, at will. However, other means may be provided for retaining the members 22 and 24 in predetermined positions relative to each other as will be described herein in conjunction with an alternate embodiment of the present invention.

Referring further to FIGS. 1, 4, 5 and 7, the rear panel 42 of the member 24 is provided with means for supporting the notepad holder 20 on a suitable surface, such as an interior surface of an automobile vehicle. In particular, a resilient suction cup 60 is suitably attached to the rear panel 42 of member 24 by providing the suction cup 60 with a generally rectangular shaped recess 62 formed in a body portion 64 of the suction cup and opposite a generally shallow spherical shaped recess 66 formed in a surface 68, FIG. 7. The recess 62 has reentrant edges 62a whereby the suction cup may be retained on a generally rectangular boss 70, FIGS. 5 and 7, which may be integrally formed as part of the rear panel 42 or formed as a separate member and suitably affixed to the rear panel 42. In this regard, the rectangular boss 70 has a base part 72 of smaller dimensional extent with respect to the boss 70 so that a peripheral rectangular flange 73 is formed for engagement with the reentrant edges 62a of the recess 62 to retain the resilient suction cup 60 on the member 24, as illustrated, and non-rotatable with respect to the member 24.

Figure 8:
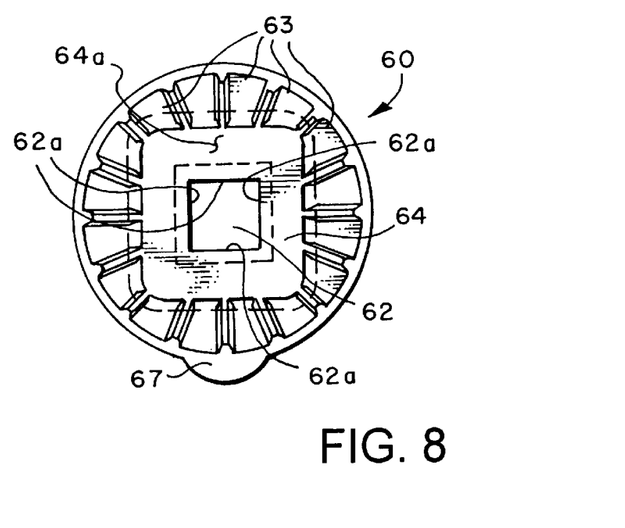
FIG. 8 is a rear elevation of the suction cup shown in FIGS. 1, 2, 4 and 7.
Figure 9:
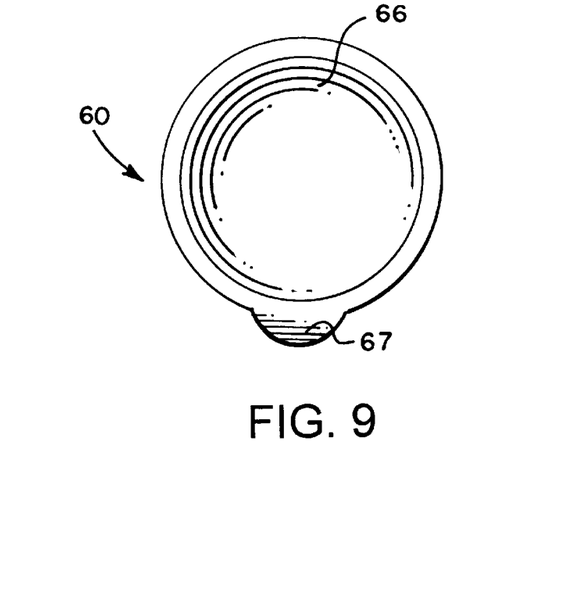
FIG. 9 is a front elevation of the suction cup.

FIGS. 8 and 9 illustrate the suction cup 60 in further detail in the respective elevation views shown. FIGS. 8 and 9, as well as FIG. 7, also show a resilient demounting tab 67 formed as part of the suction cup 60 for releasing the suction cup from a mounting surface. As shown in FIG. 8, suction cup body portion 64 has a large planar surface area 64a engageable with panel surface 42a, FIG. 7. Stability and rigidity of the connection between suction cup 60 and panel 42 is enhanced by plural circumferentially spaced, radially extending gussets 63, FIG. 8.

Figures 2, 3:
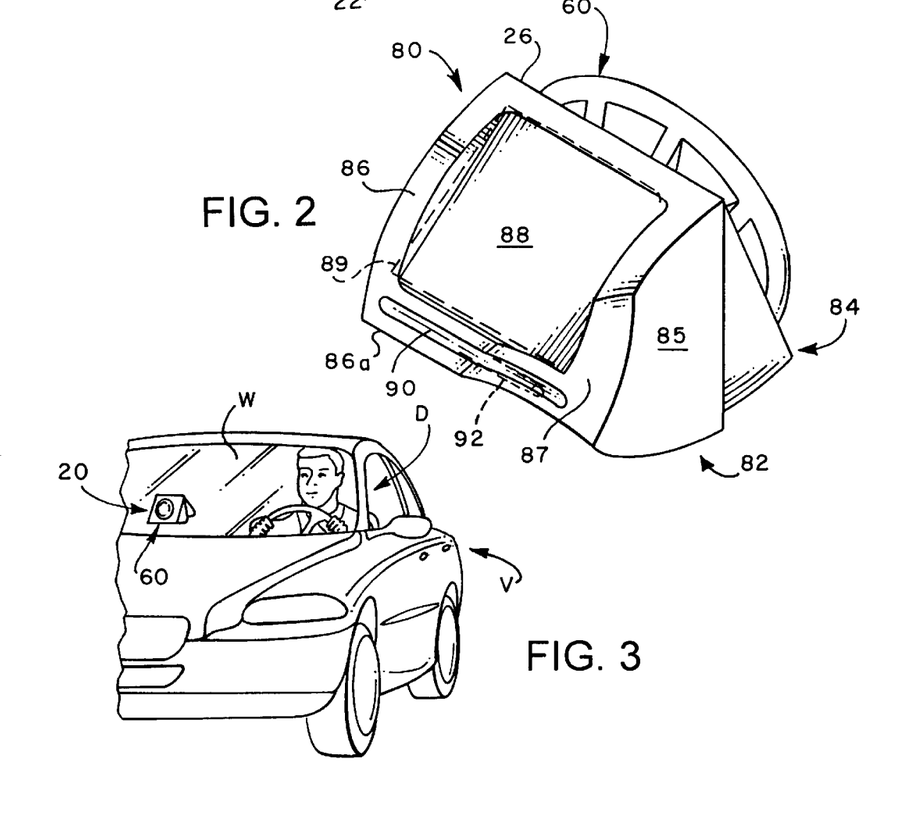
FIG. 2 is a perspective view of a first alternate embodiment of a notepad and pen holder in accordance with the invention.
FIG. 3 is a partial perspective view of an automobile vehicle showing one position of a notepad and pen holder in accordance with the invention supported on the inside surface of the vehicle windshield.

Referring briefly to FIG. 3, there is illustrated a conventional automobile vehicle V having a windshield W and a driver D seated therein. As shown in FIG. 3, notepad holder 20 is suitably mounted on the inside surface of windshield W by the suction cup 60 and is convenient for access by driver D or a passenger, not shown, seated in the passenger seat, not shown, of the vehicle V. In fact, the notepad holder 20 may be mounted on any smooth surface which will allow the suction cup 60 to adhere thereto. Alternatively, mounting means other than the suction cup 60 may be used in conjunction with the notepad holder 20.

Referring briefly to FIG. 2, a first alternate embodiment of a notepad holder in accordance with the invention is illustrated and generally designated by the numeral 80. Notepad holder 80 is provided with opposed somewhat clamshell-shaped members 82 and 84 having a configuration substantially like the members 22 and 24 of the notepad holder 20. In fact, member 84 may be identical to member 24 and may be adapted in the same way to support notepad holder mounting means comprising a suction cup 60, for example. As shown in FIG. 2, the member 82 is modified somewhat to have an arcuate front panel 86 which is substantially convex from the point of attachment of member 82 to member 84 comprising a living hinge 26. A generally rectangular recess 88 in front panel 86 is adapted to support a conventional notepad 89 therein, such as a type sold under the trademark POST IT, for example. An elongated recess 90 is adapted to support a conventional writing instrument, such as a ballpoint pen 92 therein. One advantageous feature of the notepad holder 80 is the configuration of the member 82 wherein the front panel 86 has a concave recessed area 87 which intersects side panel 85 and the bottom edge 86a of front panel 86. The concave recess or scalloped area 87 is useful to provide easy access to the notepad 89 as well as the writing instrument 92 to remove pages from the notepad and to remove the writing instrument 92 from the recess 90, when desired. In substantially all other respects, the notepad holder 80 is constructed like the notepad holder 20.

Figure 10:
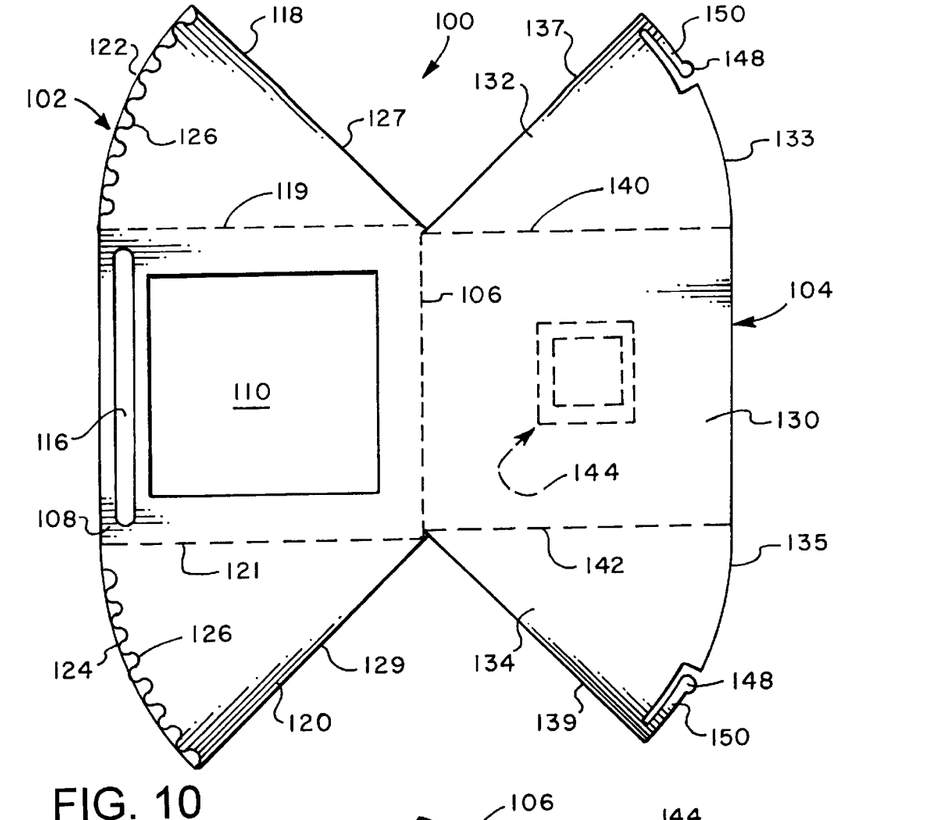
FIG. 10 is a developed plan view of a second alternate embodiment of a notepad holder in accordance with the invention.
Figure 11:
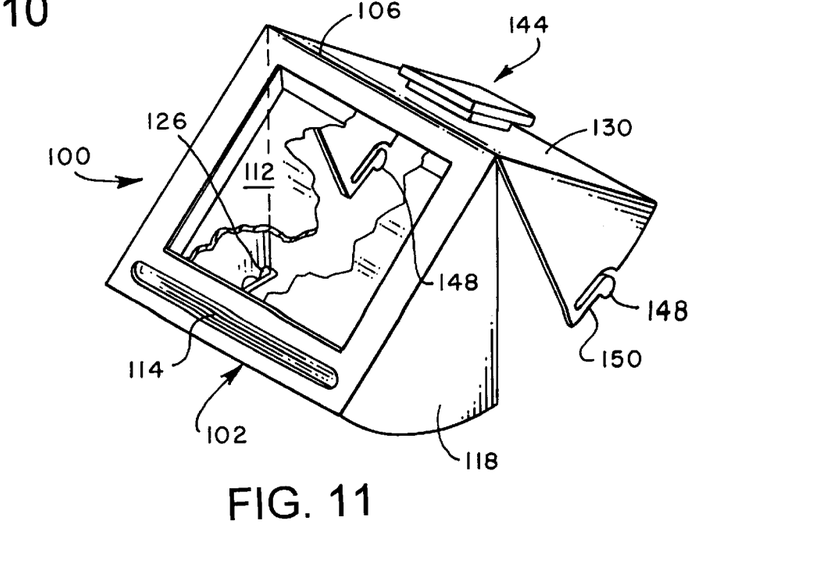
FIG. 11 is a perspective view, with portions partially broken away, showing the embodiment of FIG. 10 with the side panels folded into their working positions.

Referring now to FIGS. 10 and 11, another embodiment of a notepad holder of the present invention is illustrated and generally designed by the numeral 100. The notepad holder 100 is preferably formed as a molded plastic, generally planar article having a relatively thin wall thickness and including, as shown in the developed plan view of FIG. 10, opposed members 102 and 104 which are joined together at a living hinge 106 whose hinge axis is designed by the dashed line in FIG. 10 the member 102 includes a central or center panel 108 having a generally rectangular recess formed by a depressed wall portion 110, which in FIG. 10, projects as a generally rectangular box shaped portion outwardly from the plane of the paper. A recess formed by the depressed wall 110 is indicated in FIG. 11 by numeral 112 and is configured to receive a generally rectangular notepad, not shown. As shown in FIGS. 10 and 11, the central panel 108 also includes a writing instrument, pen or pencil, receiving recess 114, FIG. 11, which is formed by a depressed wall 116, FIG. 10, projecting out of the plane of the paper in FIG. 10. Member 102 also includes opposed circular sector shaped side panels 118 and 120 which are foldable relative to the central panel 108 along respective fold lines 119 and 121, which may be considered somewhat like living hinges. The side panel members 118 and 120 have lower arcuate convex edges 122 and 124 which are formed to have integrally molded spaced apart ridges or ratchet-like teeth 126 which project out of the plane of the paper, viewing FIG. 10. Arcuate edges 122 and 124 are delimited by corresponding linear or straight edges 127 and 129, respectively, which edges terminate at the hinge axis for the living hinge 106.

Referring further to FIGS. 10 and 11, the member 104 includes a central panel 130 which is generally planar and of the same wall thickness as the panel 108 and which is contiguous with opposed side panels 132 and 134. Side panels 132 and 134 are also delimited by arcuate convex edges 133 and 135 which intersect linear side edges 137 and 139. Edges 137 and 139 also intersect the hinge axis of living hinge 106 but at points spaced inwardly or closer to each other of the points of intersection of the panel edges 118 and 120. Parallel fold lines or so-called living hinges 140 and 142 define edges of the side panels 132 and 134. The fold lines 140 and 142 are inset slightly from the fold lines 119 and 121 and intersect the edges 137 and 139, respectively. A generally rectangular boss 144, see FIG. 11, is formed on the face of central panel 130 opposite the face shown in FIG. 10, see FIG. 11. The boss 144 is configured substantially like the boss 70 for receiving a suction cup 60 as a support means for the notepad holder 100.

Referring again to FIG. 10, each of the side panel members 132 and 134 is provided with a resilient detent member 148 formed at the lower edges 133 and 135, respectively. Each detent member 148 is formed at the distal end of a cantilever, elastically deformable support arm 150, as shown in FIG. 10, which is resiliently deflectable away from the edges 133 and 135, respectively, to allow deflection of the detent members 148.

Fabrication of the notepad holder 100 is carried out by injection molding, for example, the entire member in the configuration shown in FIG. 10 using a suitable polymer material. Upon fabrication of the notepad holder 100 to have the configuration shown in FIG. 10, the form of the members 102 and 104 is completed by folding the panels 118 and 120 along the fold lines 119 and 121 upwardly, out of the paper, viewing FIG. 10, until the generally planar side panels 118 and 120 are perpendicular to the generally planar central panel 108. At this time the positions of the side panels 118 and 120 may be fixed by applying a suitable adhesive, for example, along the fold lines 119 and 121.

Formation of the member 104 is carried out in substantially the same manner, including folding the side panels 132 and 134 upwardly out of the plane of the paper, viewing FIG. 10, along fold lines 140 and 142 and applying a suitable adhesive as a bead along the fold lines. Since the fold lines 140 and 142 are inset slightly from the fold lines 119 and 121, the member 104 will rotate relative to the member 102 about the axis of hinge 106 so that the member 104 may nest somewhat within the confines of the member 102 between the side panels 118 and 120. Moreover, upon rotation of the member 104 with respect to the member 102, the detents 148 will engage the ratchet teeth 126 on the respective members 118 and 120 to provide a positive locking position of the member 102 relative to the member 104. In this way, the position of a notepad supported in recess 112 may be adjusted relative to the support surface for the notepad holder 100. In FIG. 11, the members 102 and 104 are shown in their formed positions but have not been rotated about the axis of hinge 106 sufficiently to provide for engagement of the detents 148 with the respective sets of ratchet teeth 126. Accordingly, an advantageous configuration of a notepad holder 100 is provided by the embodiment of FIGS. 10 and 11.

Figure 12:
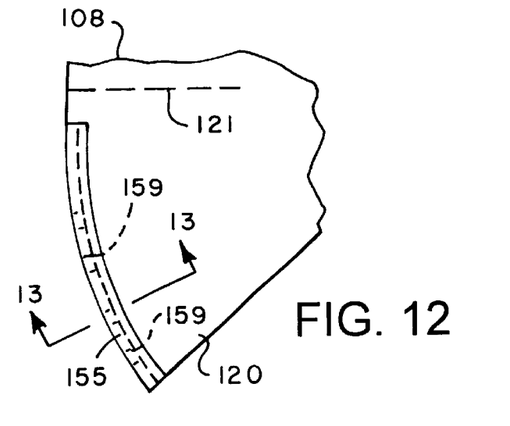
FIG. 12 is a partial plan view of a modification of one of the side panels of the embodiment of FIGS. 10 and 11.
Figure 13:
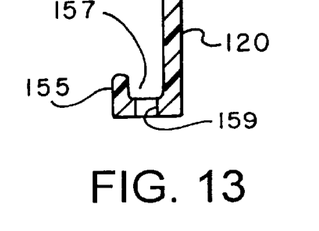
FIG. 13 is a detail section view taken along the line 13—13 of FIG. 12.

Referring briefly to FIGS. 12 and 13, a modification of the ratchet teeth for the side panel members 118 and 120 is illustrated by way of example showing a portion of the side panel 120 of the member 108 wherein, in place of the ratchet teeth illustrated in FIG. 10, ratchet teeth are formed by an integral L-shaped flange 155, see FIG. 13 also, which provides a groove 157 for receiving the side panel edge 135 and detent 148 of side panel member 134, for example. Side panel member 118 would have a similar L-shaped flange portion. Ratchet teeth are provided by spaced apart holes 159 in the channel or slot 157 which register with the detents 148 in place of the wavy ratchet teeth 126 illustrated in FIGS. 10 and 11.

Figure 14:
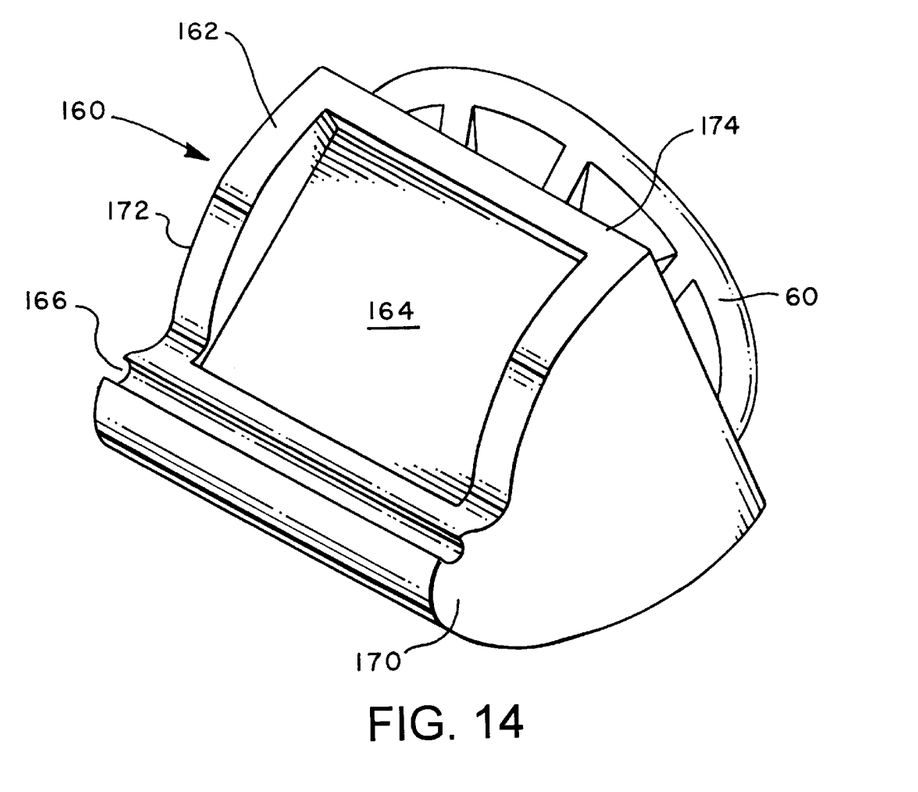
FIG. 14 is a perspective view of a third alternate embodiment of the invention.

Referring briefly to FIG. 14, yet another embodiment of a notepad holder in accordance with the invention is illustrated and generally designated by the numeral 160. The notepad holder 160 has a configuration similar to the notepad holder 20 but may be formed of a single member having a center panel or face 162, a rectangular notepad holding recess 164, and a writing instrument recess 166 formed therein. Opposed sidewalls 170 and 172 are delimited by a backwall 174 and a suction cup 60 is mountable on the backwall in the same manner as for the other embodiments of the invention. The notepad holder 160 may be molded as a single member of lightweight material, such as a high or low density foamed polymer material, for example.

While preferred embodiments of the invention have been described in detail herein, those skilled in the art will recognize that various substitutions and modifications may be made without departing from the scope and spirit of the invention as defined by the appended claims.

What is claimed is:

1. A notepad holder comprising:

a first member having a center panel for supporting a notepad thereon and opposed side panels integrally formed with said center panel of said first member and foldable with respect to said center panel of said first member into positions extending generally parallel to each other and extending rearwardly from said center panel of said first member;

a second member connected to said first member by a living hinge, said second member being angularly adjustable with respect to said first member about said living hinge; and support means connected to said second member for mounting said notepad holder on a surface.

2. The notepad holder set forth in claim 1 wherein:
said second member includes a center panel and opposed side panels connected to said center panel on opposite sides thereof.

3. The notepad holder set forth in claim 2 wherein:
said opposed side panels of said second member extend forwardly from said center panel of said second member.

4. The notepad holder set forth in claim 3 wherein:
said second member is moveable relative to said first member in nesting relationship between the side panels of said first member.

5. The notepad holder set forth in claim 3 including:
a support boss mounted on said center panel of said second member for supporting a suction cup for attaching said notepad holder to a surface.

6. The notepad holder set forth in claim 1 including:
means on said first member cooperable with means on said second member for retaining said first and second members in a substantially fixed position relative to each other about said living hinge.

7. A one-piece article providing a notepad holder comprising:

a first, central panel defining a notepad recess, said first central panel having a first side and a second side, wherein said first side is opposite said second side;

a second, central panel attached by a living hinge to said first central panel, said second central panel being narrower than said first central panel and said second central panel having a first side and a second side, wherein said first side is opposite said second side;

a first side panel attached to said first side of said first central panel, said first side panel flaring outwardly from said first central panel;

a second side panel attached to said second side of said first central panel, said second side panel flaring outwardly from said first central panel;

a third side panel attached to said first side of said second central panel, said third side panel flaring outwardly from said second central panel; and a fourth side panel attached to said second side of said second central panel, said fourth side panel flaring outwardly from said second central panel; whereby said notepad holder is constructed by fixing said first, second, third and fourth side panels substantially at right angles to said first and second central panels, respectively, to form front and rear shell portions connected by said living hinge, one of said shell portions slidably nesting within the other of said shell portions.

8. The article of claim 7 wherein:
at least one of said side panels further comprises a series of teeth disposed on an interior surface of said one side panel; and another of said side panels further comprises a resiliently biased detent disposed on an outer edge of said another side panel, said detent engaging said teeth when said one shell portion nests within said other shell portion; whereby adjustable angular articulation is achieved between said front shell portion and said second shell portion.

9. A notepad and pen holder comprising:
a first central panel, said first central panel defining a recess for holding a notepad and a cavity for holding a writing instrument, said first central panel having a first side and a second side, wherein said first side is opposite said second side;

a first side panel connected to said first side of said first central panel, said first side panel flaring rearwardly from said first central panel, an interior surface of said first side panel having a first series of teeth thereon;

a second side panel connected to said second side of said first central panel, said second side panel flaring rearwardly from said first central panel, an interior surface of said second side panel having a second series of teeth thereon;

a second central panel articulably attached by a hinge to said first central panel, said second central panel being narrower than said first central panel, said second central panel having a boss formed thereon and said second central panel having a first side and a second side wherein said first side is opposite said second side;

a third side panel connected to said first side of said second central panel, said third side panel flaring forwardly from said second central panel, said third side panel having a first outwardly-biased detent on an outer perimeter edge of said third side panel, said first outwardly-biased detent engaging said first series of teeth on said first side panel for angular adjustment of said first and second central panels;

a fourth side panel connected to said second side of said second central panel, said fourth side panel flaring outwardly from said second central panel, said fourth side panel having a second outwardly-biased detent on an outer perimeter edge of said fourth side panel, said second outwardly biased detent engaging said second series of teeth on said second side panel for angular adjustment of said first and second central panels;

said third and fourth side panels nesting within said first and second side panels; and a suction cup attached to said second central panel by said boss, said suction cup having a release tab, a support body, restricting motion of said second central panel with respect to said suction cup; whereby said notepad and pen holder provides a conveniently positionable and adjustable note-taking facility.

10. A notepad holder comprising:
a first member including opposed side panels and a portion for supporting a notepad thereon;

a second member connected to said first member by a hinge, said second member including a center panel and opposed side panels connected to said center panel on opposite sides thereof, said opposed side panels of said second member extending forwardly from said center panel of said second member, and said second member is moveable relative to said first member in nesting relationship between the side panels of said first member such that said second member is angularly adjustable with respect to said first member about said hinge; and support means connected to said second member for mounting said notepad holder on a surface.

11. A notepad holder comprising:

a first member having a portion for supporting a notepad thereon;

a second member connected to said first member by a living hinge, said second member being angularly adjustable with respect to said first member about said living hinge;

means on said first member cooperable with means on said second member for retaining said first and second members in a substantially fixed position relative to each other about said living hinge comprising ratchet teeth formed on one of said members and a cooperating detent formed on the other of said members engageable with said ratchet teeth; and support means connected to said second member and adapted for mounting said notepad holder on a surface.

12. A notepad holder comprising:

a first member including opposed side panels and a portion between said side panels for supporting a notepad thereon;

a second member connected to said first member by a hinge, said second member including a center panel and opposed side panels connected to said center panel on opposite sides thereof, said opposed side panels of said second member extending forwardly from said center panel of said second member, and said second member is moveable relative to said first member with the side panels of one member being in nesting relationship between the side panels of the other member such that said second member is angularly adjustable with respect to said first member about said hinge; and a support on one of said members for mounting said notepad holder on a surface.

* * * * *